Feb. 15, 1927.

H. C. THRIFT 1,617,509

APPARATUS FOR SCREWING TOGETHER AND UNSCREWING JOINTS OF PIPE AND THE LIKE

Original Filed Nov. 12, 1921   2 Sheets-Sheet 1

Feb. 15, 1927.
H. C. THRIFT
1,617,509
APPARATUS FOR SCREWING TOGETHER AND UNSCREWING JOINTS OF PIPE AND THE LIKE
Original Filed Nov. 12. 1921   2 Sheets-Sheet 2
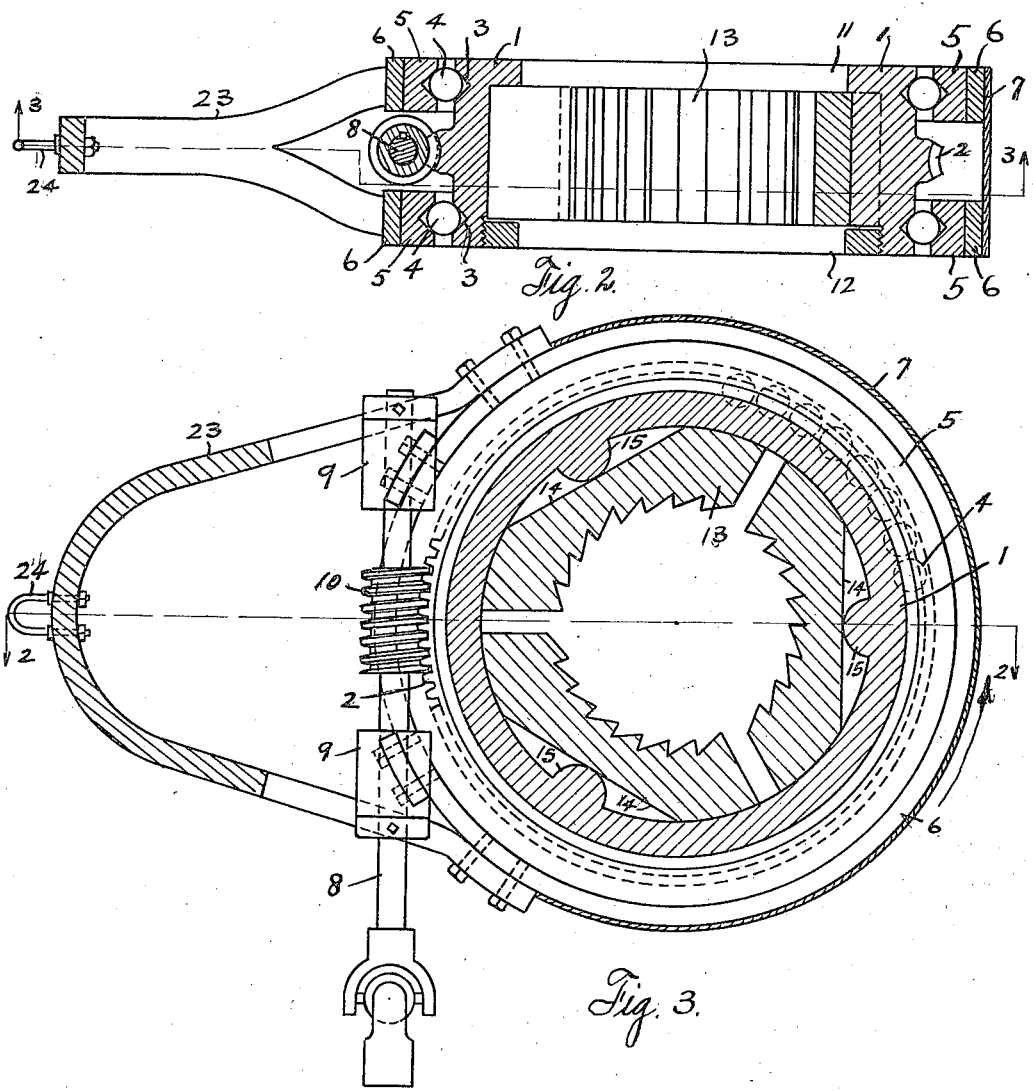
Inventor
Homer C. Thrift
By
Hardway & Cathey
Attorneys Patented Feb. 15, 1927.

1,617,509

UNITED STATES PATENT OFFICE.

HOMER C. THRIFT, OF BURKBURNETT, TEXAS.

APPARATUS FOR SCREWING TOGETHER AND UNSCREWING JOINTS OF PIPE AND THE LIKE.

Application filed November 12, 1921, Serial No. 514,742. Renewed June 15, 1925.

This invention relates to new and useful improvements in an apparatus for screwing together and unscrewing joints of pipe and the like.

One object of the invention is to provide an apparatus of the character described which is specially adapted for use in unscrewing the joints of pipe or casing as the same is withdrawn from abandoned wells.

Another object is to provide an inexpensive and simple apparatus which may be easily applied to the work of unscrewing the joints of pipe or casing as the same is withdrawn where the ordinary appliances used for unscrewing pipes or casing in well drilling are not available; however, the machine may be used generally for screwing together or unscrewing joints of rods, or pipe.

With the above and other objects in view the invention has particular relation to certain novel features of construction, operation and arrangement of parts an example of which is given in this specification and illustrated in the accompanying drawings wherein;

Figure 2 shows a vertical sectional view thereof taken on the line 2—2 of Figure 3 and Figure 3 shows a horizontal sectional view taken on the line 3, 3 of Figure 2.

Figure 1:
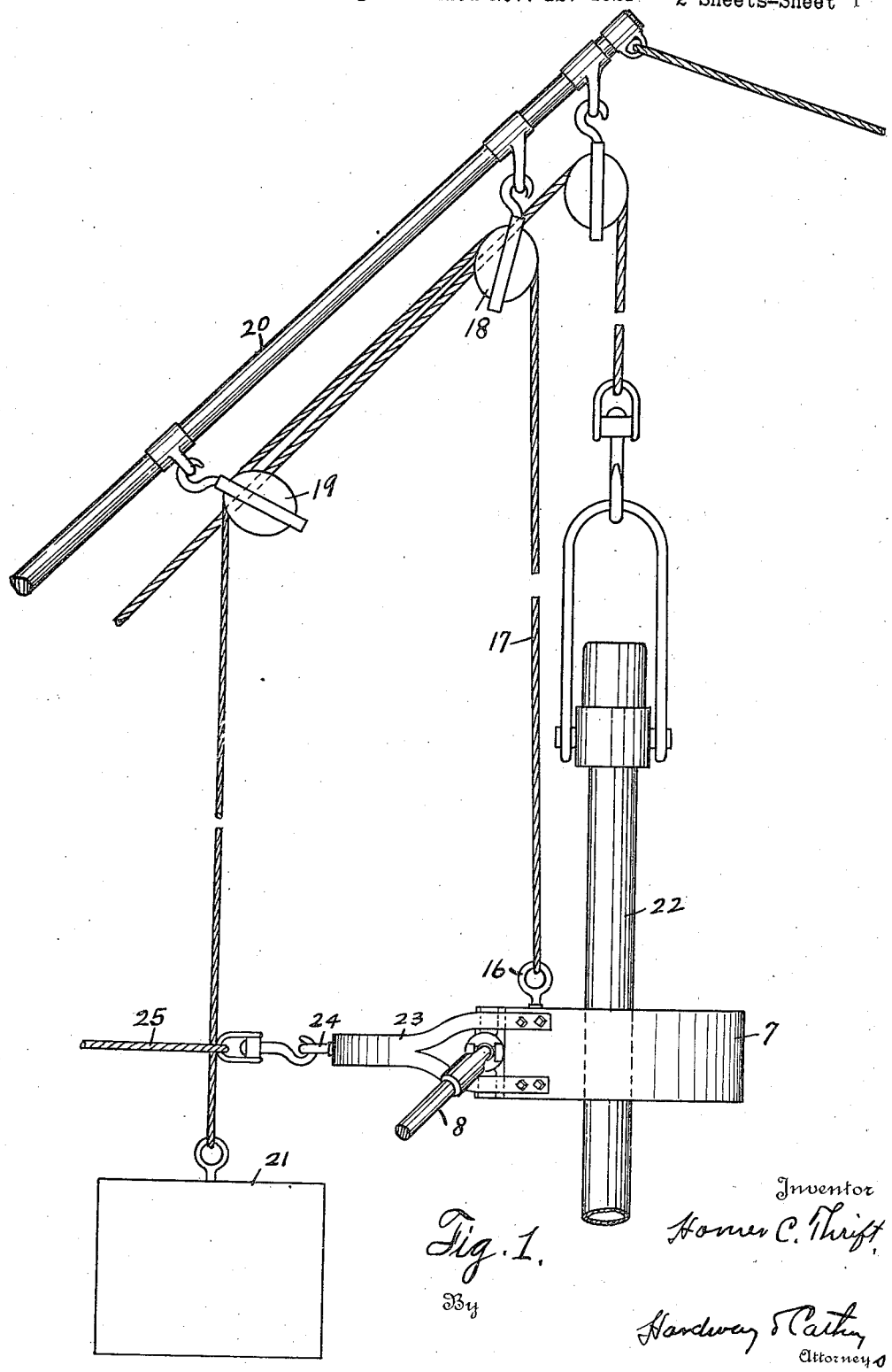
Figure 1 shows a side elevation of the device as applied to the work.

Referring now more particularly to the drawings wherein like numerals of reference designate similar parts in each of the figures, the numeral 1 designates an annular driving member whose periphery is formed with screw gear teeth 2. On opposite sides of these teeth the driving member is formed with peripheral race ways 3 to receive the anti-friction bearings 4 and these bearings are retained in place by means of the race way rings 5, 5 which are surrounded by annular bands 6, 6, enclosed by a surrounding jacket 7.

A jointed driving shaft 8 is provided which rotates in suitable bearings 9, 9 fastened to the rings 6. The shaft has a worm gear 10 keyed thereon and in mesh with the teeth 2.

The driving member 1 has the upper and lower inwardly extending annular flanges 11 and 12, the latter of which is screwed into place, said flanges forming retaining means for the sectional pipe gripping jaws 13. The inner faces of these jaws are arcuate and serrated forming engaging teeth and the outer sides of the jaws have flat bearing faces 14 against which the bosses 15, projecting inwardly from the driving member, bear.

The numeral 16 designates an eye-bolt which is fastened to the jacket and to which one end of the cable 17 is attached. This cable passes over the sheaves 18 and 19 carried by the boom 20 and attached to the other end of the cable 17 is a weight 21. The device is thus suspended in position for use and is clamped around the pipe 22, to be rotated, as shown in Figure 1.

A bracket 23 is fastened to the upper and lower rings 6, 6 and is provided with a clevis 24 to which a suitable cable 25 is secured at one end, the other end of this cable being attached to a suitable support (not shown). When power is applied through the shaft 8 the driving member will be turned in the direction indicated by the arrow in Figure 3 and the jaws 13 will engage with the pipe. As power is applied said jaws will be contracted by wedging against the bosses 15 and will securely grip and turn the pipe.

The apparatus described is comparatively light and of simple construction and is readily portable so as to be available for use whenever needed.

What I claim is:

A device of the character described including a jacket, a ring-like driving member therein through which pipe is adapted to extend, pipe engaging jaws mounted within said driving member, the outer sides of said jaws having flat bearing faces, bosses projecting inwardly from the driving member, and bearing against said respective faces, and means for rotating said driving member.

In testimony whereof I have signed my name.

HOMER C. THRIFT.